Nov. 8, 1955          B. E. RICKS          2,723,141

CLAMP LOCATING DEVICE

Filed Feb. 25, 1950

Inventor
Bernard E. Ricks
Attys

United States Patent Office 2,723,141
Patented Nov. 8, 1955

2,723,141

CLAMP LOCATING DEVICE

Bernard Elijah Ricks, Detroit, Mich., assignor to Thompson Products, Inc., Cleveland, Ohio, a corporation of Ohio Application February 25, 1950, Serial No. 146,198

3 Claims. (Cl. 287—62)

This invention relates generally to a coupling structure of the type employing a radially collapsible element and clamping means associated therewith to selectively exert a clamping thrust on such radially collapsible element.

More particularly this invention relates to a novel and improved clamping structure incorporating positioning means as a part thereof to locate the clamping means and the radially collapsible element in a predetermined relatively fixed axial and peripheral position.

In any coupling structure wherein a radially collapsible member such as a slotted intermediate tube is biased inwardly into clamped engagement with a stem, proper and efficient clamping occurs only if the radially inwardly directed thrust delivered by the clamping means is directed to the radially collapsible tube in a locale adjacent the slot thereof and sufficiently close to the end of the tube to exploit the full advantages of the cantilever bending action afforded by the slot in the tubing.

If a clamp employing a tightening bolt is employed, if not positioned correctly to readily collapse the tube element, additional tightening of the clamping means may produce a material failure in the clamping structure.

According to the general features of the present invention, a radially collapsible element is provided which preferably takes the form of a sleeve having an axial slot formed along the longitudinal length thereof. A clamping structure is provided which includes a generally U-shaped body having a pair of parallel legs, one leg of which defines a radially inwardly projecting tooth to be received by the axial slot, thus providing for the peripheral positioning of the clamp relative to the sleeve in a predetermined fixed radial position. One or more abutments are formed on the outer peripheral surface of the sleeve in the general locale of the axial slot so as to position the legs of the clamping structure at a predetermined fixed longitudinal position relative to the sleeve. By such provision, the clamping structure is positively located in the correct position relative to the end of the tube and relative to the slot in the tube.

It is an object of this invention, therefore, to provide a clamp locating device which will position a clamp relative to an axially slotted radially collapsible member in a predetermined fixed peripheral and longitudinal position.

Another object of the present invention is to provide a clamp locating device which is completely independent of visual positioning requisites.

A further object of the present invention is to provide a clamping structure which may be related to an axially slotted radially collapsible coupling structure in the correct position to deliver the most efficient clamping thrust to such member.

Many other features, advantages and additional objects of the present invention will become manifest to those versed in the art upon making reference to the detailed description which follows and the accompanying sheets of drawings, in which.

As shown on the drawings.

Figure 1:
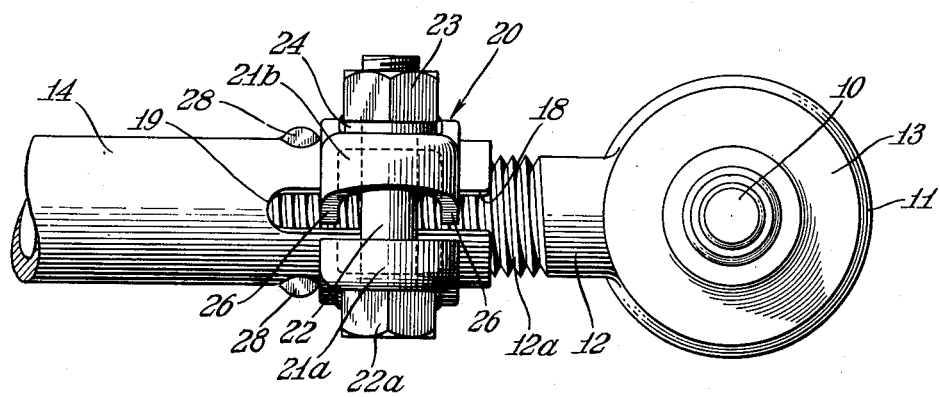
Figure 1 is an elevational plan view of a coupling structure employing a clamp locating device according to the present invention.
Figure 2:
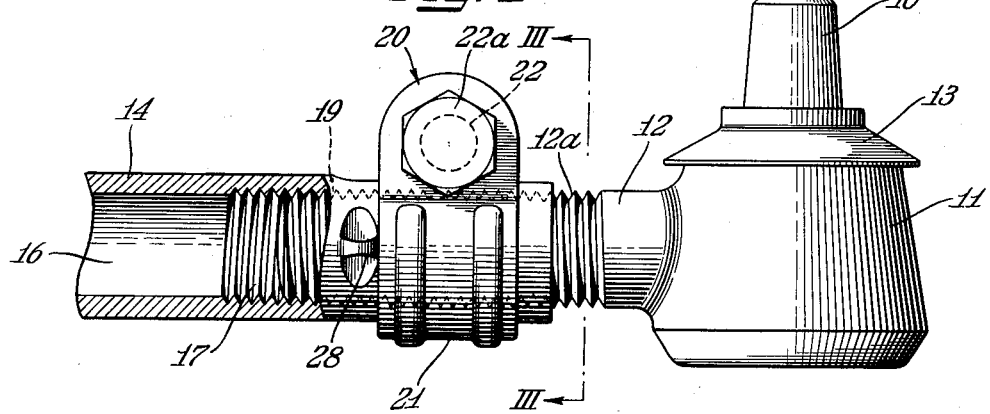
Figure 2 is a side elevational view with parts broken away and parts shown in cross section of the coupling structure shown in Figure 1.
Figure 3:
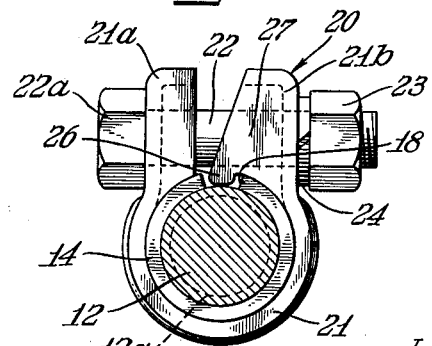
Figure 3 is a cross-sectional view with parts shown in elevation taken on line III—III of Figure 2.

Although the principles of the present invention are of general applicability, they are herein disclosed in connection with their embodiments in a coupling joint of a linkage structure of a vehicular steering linkage.

As shown on the drawings, a threaded stud 10 is mounted for universal movement in a tie rod end socket housing 11 having a stem 12 externally threaded as at 12a. A cover 13 may also be provided for the housing 11.

The radially collapsible element of the coupling structure herein shown takes the form of a sleeve like tie rod 14 having a bore 16 which is internally threaded as at 17 to effect threaded axial adjustment along the length of the threaded portion 12a of the stem 12.

The sleeve 14 is provided with an axial slot 18 which extends longitudinally of the sleeve from one end thereof inwardly and terminates in a shoulder 19.

In order to collapse the sleeve 14 radially inwardly into locking relationship with the stem 12, a clamp indicated generally by the reference numeral 20 is provided, the clamp 20 including a generally U-shaped body 21 having a pair of parallel legs 21a and 21b which may be collapsed inwardly to produce a clamping action by means of a bolt 22 having a bolt head 22a abutting the leg 21a and upon which a nut 23 may be selectively turned into abutting engagement with a conventional lock washer 24 interposed between the nut 23 and the leg 21b.

According to the present invention, the clamp 20 is always located on the sleeve 14 in a predetermined relatively fixed peripheral position by means of a tooth 26 formed as a projection on the end of a flange 27 turned over from one of the legs of the body 21 of the clamp 20. In this particular embodiment, the body 21 may be stamped from sheet stock and die formed with a flange 27 on each side of the leg 21b so as to define a pair of teeth 26, 26. The pair of teeth 26, 26 are received by the slot 18, thereby placing the parallel legs 21a and 21b in a general co-planar relationship to the radial plane passing through the stem 12 and including the axis of the axial slot 18 to permit the clamping thrust exerted by the clamp 20 to be delivered in a particularly effective manner to the radially collapsible sleeve 14.

In order to position the clamp 20 the correct distance away from the end of the sleeve 14 and away from the unslotted portion of the sleeve beginning at the shoulder 19, suitable abutments are formed on the peripheral surface of the sleeve so as to preclude inward axial movement of the clamp 20 upon the sleeve 14. In this particular embodiment, the abutments are formed by pinching the sleeve 14 in a die to form a pair of ears or projections 28, 28.

It will be apparent that I have described a coupling structure which provides a clamp locating mechanism for positively positioning a clamp relative to the end of an axially slotted radially collapsible tube and relative to the slot in the tube to promote efficient clamping action.

Although various minor modifications might occur to those versed in the art, it should be clearly understood that I do not wish to be limited to the precise details herein described by way of illustrative example for the sake of clarity only but wish to embody within the scope of this patent all such modifications as reasonably and properly come within the scope of my contribution to the art.

I claim as my invention:

1. A coupling structure comprising a sleeve having an axial slot, a stem received by the sleeve, a clamp selectively collapsing the sleeve radially and locking the sleeve to the stem, a tooth on said clamp extending radially inwardly and received by the slot of the sleeve, said tooth positioning the clamp peripherally with respect to said sleeve, and ears on said sleeve abutting the clamp and positioning the clamp longitudinally on said sleeve.

2. A coupling structure comprising an axially slotted radially collapsible sleeve, a stem axially positioned in said sleeve, and a clamp on said sleeve holding said sleeve collapsed in locked engagement with said stem, said clamp including a generally U-shaped body having a pair of parallel legs and substantially surrounding the slotted portion of the sleeve, said legs being selectively contractable to radially collapse the sleeve inwardly into locking engagement with the stem, one of the legs of the clamp having a projecting tooth received by the slot of the sleeve to peripherally position the clamp.

3. A coupling structure comprising an axially slotted radially collapsible sleeve, a stem axially positioned in said sleeve, and a clamp on said sleeve holding said sleeve collapsed in locked engagement with said stem, said clamp including a generally U-shaped body having a pair of parallel legs and substantially surrounding the slotted portion of the sleeve selectively contractable to radially collapse the sleeve inwardly into locking engagement with the stem, one of the legs of the clamp having a tooth received by the slot of the sleeve and peripherally positioning the clamp, and abutments formed on the sleeve abutting the clamp and positioning the clamp in a longitudinal position.

References Cited in the file of this patent

UNITED STATES PATENTS

| Number | Name | Date |
|---|---|---|
| 476,911 | Westwood | June 14, 1892 |
| 1,205,131 | Beck | Nov. 14, 1916 |
| 1,883,748 | Baker | Oct. 18, 1932 |
| 2,026,338 | Zerk | Dec. 31, 1935 |
| 2,269,170 | Allenby | Jan. 6, 1942 |
| 2,451,062 | Booth | Oct. 12, 1948 |
| 2,526,470 | Gauthier | Oct. 17, 1950 |